UNITED STATES PATENT OFFICE.

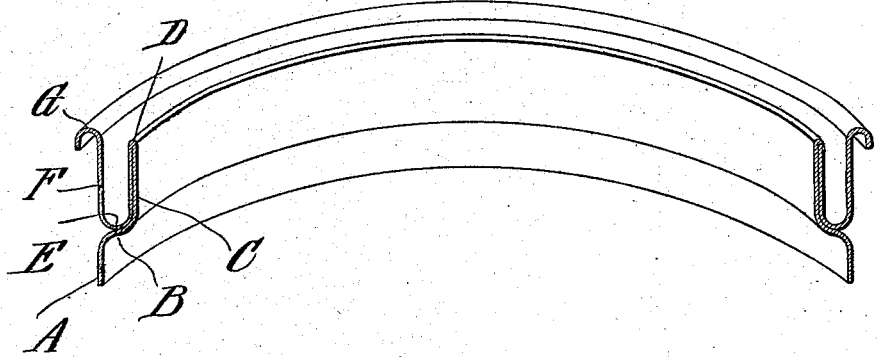
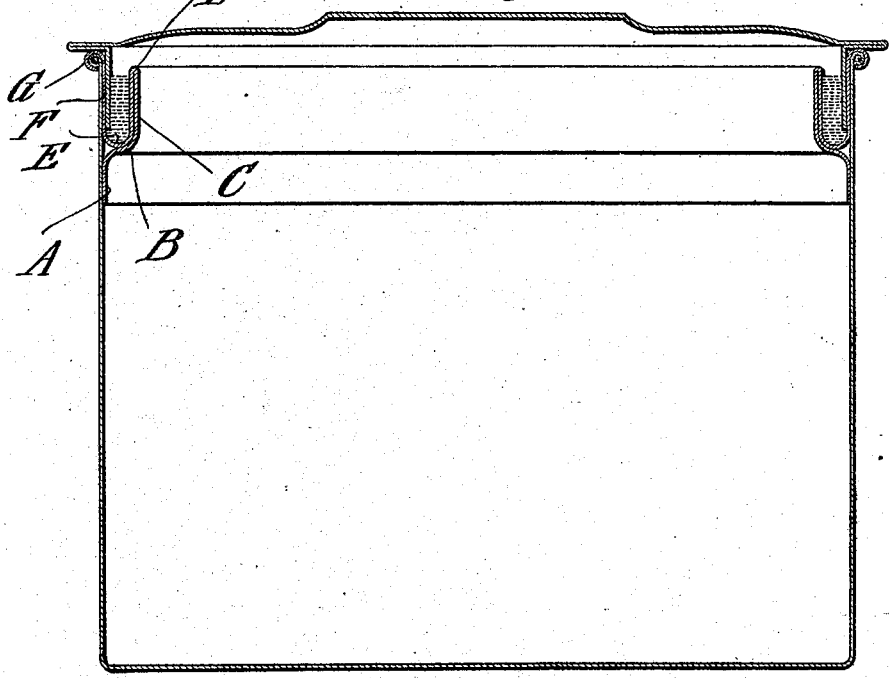

ALBERT WILLIAM MORRELL, OF CAMPBELL, CALIFORNIA, ASSIGNOR TO THE CALIFORNIA FIRELESS COOKSTOVE CO., OF CAMPBELL, CALIFORNIA.

COOKER.

No. 905,212.　　　Specification of Letters Patent.　　　Patented Dec. 1, 1908.

Application filed April 18, 1908. Serial No. 427,882.

*To all whom it may concern:*

Be it known that I, ALBERT WILLIAM MORRELL, a citizen of the United States, residing at Campbell, in the county of Santa Clara and State of California, have invented a new and useful Cooker, of which the following is a specification.

This invention relates to water-seals for domestic cooking-vessels.

By way of inducement I will state that the prevention of the escape of odors from foods in the process of cooking, although an end always to be sought after, is particularly desirable when domestic cooking utensils are used in that type of apparatus known as fireless-cookers. In devices of that character, the escaping vapors pass, not merely into the surrounding atmosphere to be dissipated by ventilation, but into the porous, absorbent material which surrounds the cooking vessel, rendering the heat insulating medium in a short time, fetid and unsanitary.

Of the various expedients which have been resorted to in order to retain in a cooking vessel the odors of the food in course of preparation, a water-seal into which the edges of the vessel lid dip, has been found to be one of the most satisfactory, and it is one of the objects of this invention to provide a water sealing device which may be stamped from a single piece of metal, carried by tinsmiths and manufacturers as a stock form and readily attached by simple mechanical manipulation to any vessel of the same diameter as itself.

Another object is to provide a water sealing device which shall be wholly within the periphery of the vessel to which it is attached, permitting the vessel to be slipped within a closely fitting ring of a surrounding material, as is done in the case of fireless cookers, so called.

Another object is to provide a water sealing device so formed as to be braced at its upper and lower extremities, against impacts which otherwise would serve to alter its shape, mar its appearance and impair its utility.

A further object of the invention is to provide a water sealing device which shall be without seams through which the sealing medium might find its way.

With these and other objects in view, as will hereinafter more fully appear, the invention consists in the novel construction and arrangement of parts hereinafter described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 illustrates my device in vertical section through its diameter, previous to its attachment to the utensil of which it is to become a part. Fig. 2 shows in vertical section through its diameter my invention fastened to the rim of the interior vessel of a fireless cooker of approved type, the cover being in place, with its rim dipping into the sealing medium.

Similar letters of reference are employed to indicate corresponding parts throughout the several figures of the drawings.

As shown, my invention consists of an annulus of metal integral in the completed device, but in this description analyzed into component parts as follows: a vertically rising flange A, having a reversely curved, inwardly extending continuation B, which is extended up as at C. and sharply bent back upon itself as at D., to form an inner trough wall round at the bottom as at E; an upwardly extending outer trough wall F. forming a continuation of the bottom and lying in substantially the same plane as the flange A.; and an outwardly flexed and downwardly produced rim G., the trough being arranged as the containing vessel for the medium, and the flange and the rim serving to brace and sustain the reservoir thus formed.

Although I bind myself to no specific process of manufacture, I prefer to take a flat strip of metal and unite its ends, preferably welding them electrically. The ring thus formed is subjected to the action of a die which bends it to the form shown in Figs. 1 and 2 and in this form it is ready for the market. When it is desired to provide a vessel with a water seal, one of my sealing devices of the proper diameter is selected and placed under a follower which forces it down into the utensil, the portion G extending over the vessel's rim. I then roll the portion G into firm engagement with the head upon the rim of the utensil, after which the vessel and seal may be enameled or subjected to any further finishing process which may be desired.

Although, as has been pointed out, my invention is particularly adapted to use upon the interior vessel of a fireless-cooker, I do not limit its use to vessels of that class. It is available upon utensils of any type in which the expansive force of the contained vapor is not sufficient to raise the lower edge of the rim of the lid above the surface of the sealing medium.

I am aware that it has been proposed hitherto to use a water seal upon domestic cooking vessels of divers sorts but so far as I am advised as to the state of the art, my invention embraces certain features of patentable novelty which differentiate it from all others, and those features I aim to cover so broadly as I may, in the following claims.

What is claimed is:—

1. A water sealing device, annular in form comprising a vertical flange having an inwardly extending continuation, and a trough attached to said continuation of the flange provided with an outer wall having a vessel engaging rim.

2. A water sealing device annular in form comprising a vertical flange having an inwardly extending continuation, an inner trough wall extending upward from said continuation, a trough bottom, an outer trough wall lying in the same plane as the flange, and a vessel engaging rim formed on this outer trough wall.

3. As an article of manufacture, a water sealing device annular in shape formed of a single sheet of metal and comprising a vertical flange provided with a reversely curved inwardly extending portion, a trough formed of an upwardly extending continuation of said curved portion bent back upon itself to form the inner wall and thence upward to form the outer wall, the upwardly bent portion forming the outer wall lying in the same plane as the flange, and a vessel engaging rim formed on the outer wall.

In testimony that I claim the foregoing as my own, I have hereto affixed my signature in the presence of two witnesses.

ALBERT WILLIAM MORRELL.

Witnesses:
F. M. RIGHTER,
J. F. DUNCAN.